US012505710B2

(12) United States Patent
Sekar et al.

(10) Patent No.: US 12,505,710 B2
(45) Date of Patent: Dec. 23, 2025

(54) CONFIGURATION BASED OPTIMIZED ON-BOARD DIAGNOSTIC CODE VARIABLE GENERATION SYSTEM

(71) Applicant: Hamilton Sundstrand Corporation, Charlotte, NC (US)

(72) Inventors: Arun Kumar Sekar, Tamil Nadu (IN); Sumit Kumar, Rajasthan (IN)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 220 days.

(21) Appl. No.: 18/337,686

(22) Filed: Jun. 20, 2023

(65) Prior Publication Data

US 2024/0257586 A1 Aug. 1, 2024

(30) Foreign Application Priority Data

Jan. 30, 2023 (IN) .............................. 202311005991

(51) Int. Cl.
*G07C 5/08* (2006.01)
*G01R 31/00* (2006.01)
*G06F 11/07* (2006.01)
*G07C 5/00* (2006.01)

(52) U.S. Cl.
CPC ........... *G07C 5/0825* (2013.01); *G07C 5/008* (2013.01); *G07C 5/085* (2013.01)

(58) Field of Classification Search
CPC ...... G07C 5/0825; G07C 5/008; G07C 5/085; G07C 5/0808; G01R 31/008; G06F 11/0739
USPC ...................................................... 701/29.3
See application file for complete search history.

(56) References Cited

U.S. PATENT DOCUMENTS

| 6,742,175 | B1 | 5/2004 | Brassard |
| 6,876,314 | B1 | 4/2005 | Lin |
| 7,152,229 | B2 | 12/2006 | Chong et al. |
| 7,269,820 | B2 | 9/2007 | Maki |
| 7,392,504 | B2 | 6/2008 | Gownder et al. |
| 8,176,468 | B2 | 5/2012 | Ogami et al. |
| 8,732,680 | B2 | 5/2014 | Barik et al. |

(Continued)

FOREIGN PATENT DOCUMENTS

| EP | 2629201 B1 | 12/2017 |
| WO | 2000022517 A1 | 4/2000 |

OTHER PUBLICATIONS

Search Report issued in European Patent Application No. 24154538. 3; Application Filing Date Jan. 29, 2024; Date of Mailing Jun. 20, 2024 (10 pages).

*Primary Examiner* — Tyler D Paige
(74) *Attorney, Agent, or Firm* — CANTOR COLBURN LLP

(57) ABSTRACT

An on-board diagnostic (OBD) code variable generation system includes a data storage device that stores built-in test (BIT) program and one or more source code variable parameters defined by a source code variable format compatible with the BIT. A processor is in signal communication with the data storage device to receive one or more system variables utilized by an OBD system to indicate a system fault of a vehicle. The processor automatically adds the one or more source code variable parameters to the at least one system variable to generate a source code variable having the source code variable format and utilized by the BIT program to indicate the system fault is actually present in the vehicle.

15 Claims, 8 Drawing Sheets

(56) References Cited

U.S. PATENT DOCUMENTS

| | | |
|---|---|---|
| 10,095,716 B1 | 10/2018 | Juneja et al. |
| 10,409,563 B2 | 9/2019 | Portes et al. |
| 10,452,367 B2 | 10/2019 | Allamanis et al. |
| 2011/0040442 A1* | 2/2011 | Koepping ............ G07C 5/0808 701/31.4 |
| 2012/0101793 A1 | 4/2012 | Cheriere et al. |
| 2020/0122656 A1 | 4/2020 | Dixit et al. |
| 2021/0264694 A1* | 8/2021 | Amit ....................... G06F 16/25 |
| 2022/0122682 A1 | 4/2022 | Sharma et al. |

\* cited by examiner

| | Requirement Paragraph | Template Type | Requirement Type | BITE Description for the Requirement Title | Fault Detection and Isolation Requirement Identifiers | Fault Detection and Isolation Requirement Sub-identifiers | Fault Detection and Isolation Requirement | Ambiguity Group (LRU list) - Types of Failures |
|---|---|---|---|---|---|---|---|---|
| 40 | | | | | | | | |
| 41 | Comment | | | | | | | |
| 42 | Comment | | | | | | | |
| 43 | Comment | | SPDA_1_LRM_03_dsPic ←402 | | | | | |
| 44 | Comment | | | | | | | |
| 45 | Comment | | SPDA_1_LRM_03_dsPic | Loss of communication fault | | | | |
| 46 | Comment | | | | | | | |
| 47 | 9.5.5.1.1.1 | Single Fault Reporting | SPDA_1_LRM_03_dsPic_01 Loss Comm Monitor | This is applicable to a single dsPIC. If it fails 2 times in a row on the internal integrity check (such as RAM/ROM), then it will failsafe. This test is done at power up and continuously | MODE | Mode Logic | | |
| 48 | | | | | | Inhibited by Monitor(s) | [TRUE] | [SPDA_1_LRM_03 Type and Loc Monitor, SPDA_1_LRM_02 Safemode, SPDA_2_LRM_02 Safemode] |
| 49 | | | | | | Related External Comm Bus Validity | | [NA] |

FIG. 4A

| Additional Mode Logic | [[[SPDA_1_LRM_03_Disc_01_IS_NOT_A_SPARE_PER_CONF = TRUE] 'OR' [SPDA_1_LRM_03_Disc_02_IS_NOT_A_SPARE_PER_CONF = TRUE] 'OR' [SPDA_1_LRM_03_Disc_03_IS_NOT_A_SPARE_PER_CONF = TRUE] 'OR' [SPDA_1_LRM_03_Disc_04_IS_NOT_A_SPARE_PER_CONF = TRUE] 'OR' [SPDA_1_LRM_03_Disc_05_IS_NOT_A_SPARE_PER_CONF = TRUE] 'OR' [SPDA_1_LRM_03_Disc_06_IS_NOT_A_SPARE_PER_CONF = TRUE] 'OR' [SPDA_1_LRM_03_Disc_07_IS_NOT_A_SPARE_PER_CONF = TRUE] 'OR' [SPDA_1_LRM_03_Disc_08_IS_NOT_A_SPARE_PER_CONF = TRUE]] 'AND' [SPDA_1_TTP_VALID = TRUE]] |

| Design Note ▽ | Release to Software ▽ | Text Validation ▽ |
|---|---|---|
| | | |
| | | |
| | | |
| The dsPIC losses comm due to its internal check such as RAM, ROM etc at power up or continuous test or actual communication hardware failure | [YES] | 20160518 DO, DP, AK |
| This monitor is inhibited if the power module in this slot is a wrong type | | 20160518 DO, DP, AK |
| This is to make sure that this DsPic being used per configuration table, at least one of its inputs or outputs is not a spare | | 20160518 DO, DP, AK |
| Discrete Inputs are not in the config table, a separate file list the inputs used | | 20160518 DO, DP, AK |

FIG. 4C

| | A | B | C | D | E | F |
|---|---|---|---|---|---|---|
| 1 | SYMBOL DEFINITIONS (C919_RPDU_bite_module_AppIBook.xls, Symbols) | | | | | |
| 2 | Tool Name | Type | Code Name | Scaling Factor | Offset | Update Rate (mS) |
| 3 | CBE_snapshotData105 | SNAPSHOT_DATA_1_05 | CBE_snapshotData105 | | | 1200 |
| 4 | RPDU_1_LRM_02_POS28V_2_BUS_FAILED | BITE_BOOLEAN | BITE_Rpdu_Lm_Pos28v_2_Bus_Failed_a[0][2] | | | 1000 |
| 5 | RPDU_1_LRM_02_FIRST_RCVD_DATA | BITE_BOOLEAN | BITE_Rpdu_Lm_First_Rcvd_Data_a[0][2] | | | 1000 |
| 6 | RPDU_20_LRM_03_FIRST_RCVD_DATA | BITE_BOOLEAN | *******Caution! The RPDU number is not within its range [1, 15 for this symbol name******* | | | 1000 |
| 7 | RPDU_1_LRM_05_PS_BUS_A_FAILED_OPEN | BITE_BOOLEAN | BITE_Rpdu_Lm_Ps_Bus_A_Failed_Open_a[0][5] | | | 1000 |
| 8 | RPDU_1_LRM_05_PS_BUS_A_FAILED_CLOS | BITE_BOOLEAN | BITE_Rpdu_Lm_Ps_Bus_A_Failed_Closed_a[0][5] | | | 1000 |
| 9 | RPDU_0_LRM_05_PS_BUS_A_FAILED | BITE_BOOLEAN | *******Caution! The RPDU number is not within its range [1, 15 for this symbol name******* | | | 1000 |
| 10 | RPDU_1_LRM_03_POS28V_2_BUS_FAILED | BITE_BOOLEAN | BITE_Rpdu_Lm_Ps_Bus_Failed_a[0][3] | | | |
| 11 | RPDU_1_LRM_03_dsPic_FAILED | BITE_BOOLEAN | BITE_Rpdu_1_LRM_dsPic_Failed_a[0][3] | | | 1000 |

FIG. 5

CONFIGURATION BASED OPTIMIZED ON-BOARD DIAGNOSTIC CODE VARIABLE GENERATION SYSTEM

CROSS-REFERENCE TO RELATED APPLICATIONS

This application claims the benefit of Indian Application No. 202311005991 filed Jan. 30, 2023, the disclosure of which is incorporated herein by reference in its entirety.

BACKGROUND

The present disclosure relates to system diagnostics, and more particularly, to optimizing the generation of on-board diagnostic (OBD) variable codes used by a diagnostic tool.

Diagnostic tools (also referred to as built-in test (BIT) tools) such as an AUTOGEN On-Board Diagnostic (OBD) scanning tool are used to read source code variables that represent the occurrence of one or more faults in a vehicle system such as, for example, an aircraft system. When the occurrence of a system fault is detected, the system outputs the corresponding source code variable on a communication bus.

A service technician can connect the OBD scanning tool to the communication bus to read out the source code from the communication bus and display the corresponding source code variable. In some instance, the scanning tool itself stores an index that maps pre-stored source code variables to their corresponding system fault. Accordingly, the OBD scanning tool reads out the source code generated by the OBD system and displays information identifying the corresponding fault that is present in the vehicle system. In other instance, the service technician compares the source code variable displayed by the OBD scanning tool to an index that is located remotely from the scanning tool (e.g., in a computer database, data workbook, or physical manual) to identify the corresponding fault that is present in the vehicle system.

BRIEF DESCRIPTION

According to some embodiments of the present disclosure, an on-board diagnostic (OBD) code variable generation system includes a data storage device that stores built-in test (BIT) program and one or more source code variable parameters defined by a source code variable format compatible with the BIT. A processor is in signal communication with the data storage device to receive one or more system variables utilized by an OBD system to indicate a system fault of a vehicle. The processor automatically adds the one or more source code variable parameters to the at least one system variable to generate a source code variable having the source code variable format and utilized by the BIT program to indicate the system fault is actually present in the vehicle.

In addition to one or more of the features described herein, or as an alternative, further embodiments, the one or more source code variable parameters includes an OBD system prefix indicative of the system and/or software used to process the OBD software code, and a system suffix identifying one or more devices included a system of the vehicle and associated with the system fault indicated by the at least one system variable.

In addition to one or more of the features described herein, or as an alternative, further embodiments, in response to generating the source code variable, the processor automatically stores the source code variable in the data storage device.

In addition to one or more of the features described herein, or as an alternative, further embodiments, the BIT program generates an electronic source variable workbook which is stored in the data storage device and the processor automatically stores the source code variable in the electronic source variable workbook.

In addition to one or more of the features described herein, or as an alternative, further embodiments, the processor receives an electronic system variable workbook, automatically extracts a plurality of system variables from the system variable workbook, and automatically generates the source code variable corresponding to each of the system variables.

In addition to one or more of the features described herein, or as an alternative, further embodiments, the system is a power distribution system device included in the vehicle and the one or more devices includes a line-replaceable modules (LRM) included in the power distribution system.

In addition to one or more of the features described herein, or as an alternative, further embodiments, the BIT program generates an alert in response to the source code variable conflicting with the source code variable format.

According to another non-limiting embodiment of the present disclosure, a method of generating a an on-board diagnostic (OBD) code variable is provided. The method includes storing in a data storage device a built-in test (BIT) program and one or more source code variable parameters defined by a source code variable format compatible with the BIT, and inputting to a processor at least one system variable utilized by an OBD system to indicate a system fault of a vehicle. The method further includes automatically adding, by the processor, one or more source code variable parameters to the at least one system variable to generate a source code variable having the source code variable format and utilized by the BIT program to indicate the system fault is actually present in the vehicle.

In addition to one or more of the features described herein, or as an alternative, further embodiments, adding the source code variable parameters includes adding, to the at least one system variable, an OBD system prefix indicative of the system and/or software used to process the OBD software code, and a system suffix identifying one or more devices included a system of the vehicle and associated with the system fault indicated by the at least one system variable.

In addition to one or more of the features described herein, or as an alternative, further embodiments, the processor automatically stores the source code variable in the data storage device in response to generating the source code variable.

In addition to one or more of the features described herein, or as an alternative, further embodiments, in response to generating the source code variable, the method further comprises generating, by the BIT program, an electronic source variable workbook which is stored in the data storage device, and automatically storing, by the processor, the source code variable in the electronic source variable workbook.

In addition to one or more of the features described herein, or as an alternative, further embodiments, the method further comprises inputting an electronic system variable workbook to the processor, automatically extracting, by the processor, a plurality of system variables from the system variable workbook, and automatically generating, by the processor, the source code variable corresponding to each of the system variables.

In addition to one or more of the features described herein, or as an alternative, further embodiments, the system is a power distribution system device included in the vehicle and the one or more devices includes a line-replaceable modules (LRM) included in the power distribution system.

In addition to one or more of the features described herein, or as an alternative, further embodiments, the method further comprises generating an alert in response to the source code variable conflicting with the source code variable format.

The foregoing features and elements may be combined in various combinations without exclusivity, unless expressly indicated otherwise. Features which are described in the context of separate aspects and embodiments may be used together and/or be interchangeable. Similarly, features described in the context of a single embodiment may also be provided separately or in any suitable subcombination. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

Various features will become apparent to those skilled in the art from the following detailed description of the disclosed non-limiting embodiments. The drawings that accompany the detailed description can be briefly described as follows:

FIGS. 4A, 4B and 4C collectively depict a system variable workbook including system variables indicative of system faults corresponding to respective line-replaceable modules of a remote power distribution unit according to a non-limiting embodiment;

FIG. 5 depicts a source code variable workbook including diagnostic source variables that are automatically generated by an OBD code variable generation based on system variables according to a non-limiting embodiment.

Figure 1:
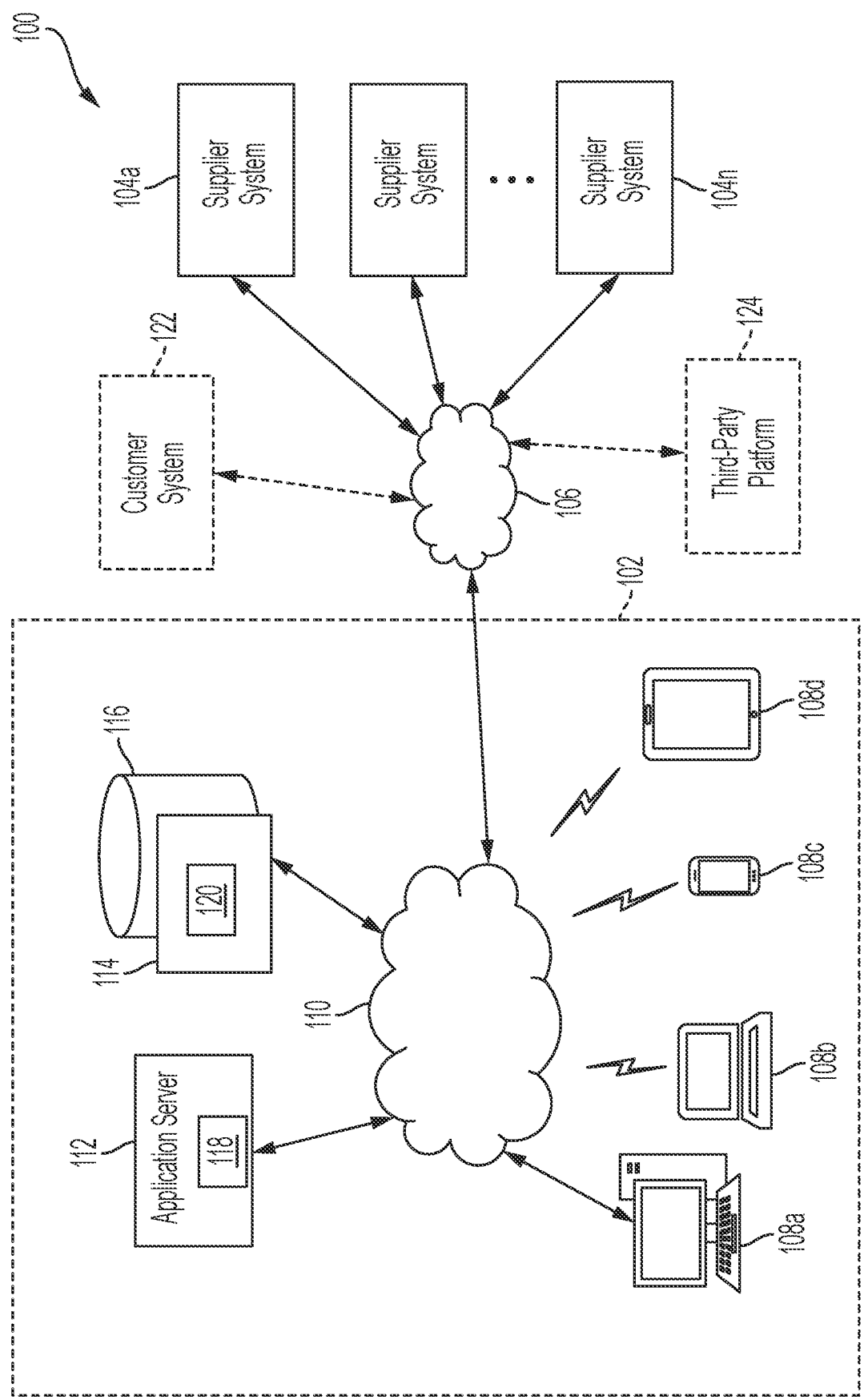
FIG. 1 depicts a computing environment capable of implementing an OBD code variable generation system according to a non-limiting embodiment of the present disclosure.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

DETAILED DESCRIPTION

The current system and method used to generate the AUTOGEN source code variables requires a technician to manually perform several tedious operations. For example, technician must first determine one or operating conditions, which when present will cause the occurrence of a corresponding system fault, and then manually assign system variables to each system fault. The system variable is used to generate a source code variable, which can then be read by the AUTOGEN diagnostic tool to identify the specific fault occurring in the system. The technician then manually records all the system variables in a database, data workbook, and/or physical manual, and maps them to their corresponding system fault.

Once recorded, the system variables are used to generate AUTOGEN OBD tool source code that represents a corresponding system variable, and which can be read and processed by the AUTOGEN OBD scanning tool to identify the particular fault occurring in the vehicle system. The technician then manually assigns source code variables to the AUTOGEN OBD tool source code, which are intended to mirror the system variables recorded in the database, workbook, and/or manual. In this manner, when the AUTOGEN OBD scanning tool reads the source code generated by the OBD system, it can display a source code variable which the technician can map to the system variables recorded in the index (e.g. the database, workbook, and/or manual) in order to identify the fault occurring in the vehicle system.

However, the source code variables manually generated by the technicians are susceptible to human error are not generated and managed in an optimized way. Furthermore, the system variables corresponding to the various system faults can be manually recorded inconsistently across different databases, workbooks, and/or manuals. These above-mentioned problems lead to discrepancies when attempting to use the OBD scanning tool to identify system faults, which causes inefficient uses of time and increases program costs.

Various non-limiting embodiments of the present disclosure provide a configuration based optimized on-board diagnostic (OBD) code variable generation system (referred to herein as an "OBD code variable generation system." The OBD code variable generation system is configured to optimally auto-populate OBD source code variables based on configuration data that is specific to the programs. The OBD code variable generation system is also capable of managing the coding standards and can check for ambiguities and/or errors in the source code variable names.

With reference now to FIG. 1, a computing system 100 capable of implementing an OBD code variable generation system is illustrated according to a non-limiting embodiment of the present disclosure. The system 100 generally includes at least one originating system 102, multiple supplier systems 104a-104n, and at least one network 106.

The originating system 102 generally represents a computing system that is owned by, operated by, or otherwise associated with an originating organization. In some cases, the originating organization may represent a government contractor or other private or commercial organization that uses the system 100 to source or obtain raw materials, individual components, subassemblies, parts, or other items (generally referred to as "materials") for products that are assembled or otherwise manufactured by the organization.

In other cases, the originating organization may represent a private or commercial organization that uses the system 100 to source services that are to be provided to the organization. In still other cases, the originating organization may represent a public entity, such as a public utility, or other governmental entity that uses the system 100 to source materials or services to be provided to the governmental entity. Note that while a single originating system 100 is shown here, the system 100 may include any number of originating systems 100 associated with any number of originating organizations.

Each supplier system 104a-104n can represent a computing system that is owned by, operated by, or otherwise associated with a supplier of one or more materials or services that might be provided to at least one originating organization. In some cases, the supplier may provide materials to an originating organization, which may then use the materials in any suitable manner. In other cases, the supplier may provide services to an originating organization. Note that while n supplier systems 104a-104n are shown here, the system 100 may include any number of supplier systems 104a-104n associated with any number of suppliers.

The network 106 facilitates communication between or involving various components of the systems 102 and 104a-104n. For example, the network 106 may communicate Internet Protocol (IP) packets, frame relay frames, Asynchronous Transfer Mode (ATM) cells, or other suitable information between network addresses. The network 106 may include one or more local area networks (LANs), metropolitan area networks (MANs), wide area networks (WANs), all or a portion of a global network such as the Internet, or any other communication system or systems at one or more locations. The network 106 may also operate according to any appropriate communication protocol or protocols. In some embodiments, the originating organization and the suppliers are separate entities, so the network 106 may typically represent or include at least one public data communication network, such as the Internet. However, private data communication networks may also be used here.

In this example, the originating system 102 includes multiple user devices 108a-108d, at least one network 110, at least one application server 112, and at least one database server 114 associated with at least one database 116. Note, however, that other combinations and arrangements of components may be used in the originating system 102.

Each user device 108a-108d is coupled to or communicates over the network 110. Communications between each user device 108a-108d and the network 110 may occur in any suitable manner, such as via a wired or wireless connection. Each user device 108a-108d represents any suitable device or system used by at least one user to provide information to the application server 112 or database server 114/database 116 or to receive information from the application server 112 or database server 114/database 116. Any suitable number(s) and type(s) of user devices 108a-108d may be used in the originating system 102. In this particular example, the user device 108a represents a desktop computer, the user device 108b represents a laptop computer, the user device 108c represents a smartphone, and the user device 108d represents a tablet computer. However, any other or additional types of user devices may be used in the originating system 102. Each user device 108a-108d includes any suitable structure configured to transmit and/or receive information.

The network 110 facilitates communication between or involving various components of the originating system 102. For example, the network 110 may communicate IP packets, frame relay frames, Asynchronous Transfer Mode (ATM) cells, or other suitable information between network addresses. The network 110 may include one or more LANs, MANs, WANs, all or a portion of a global network such as the Internet, or any other communication system or systems at one or more locations. The network 110 may also operate according to any appropriate communication protocol or protocols. In some embodiments, the network 110 is used and maintained internally within an originating organization, so the network 110 may typically represent or include at least one private data communication network. However, the network 110 may represent or include at least part of a public network, such as when the originating organization has multiple campuses or facilities that are geographically separated but communicatively coupled by the network 110.

The application server 112 is coupled to the network 110 and is coupled to or otherwise communicates with the database server 114 and database 116. The application server 112 executes one or more applications 118 to support various functions in the system 100, and the database server 114 and database 116 store various information 120 used to support the execution of the one or more applications 118. For example, the one or more applications 118 may be used to provide a GUI-based platform, and the database server 114 and database 116 may be used to store software related information 120. As described below, the GUI-based platform is used by users of the user devices 108a-108d to create and disseminate information to appropriate supplier systems 104a-104n. The GUI-based platform is also used to receive responses from the supplier systems 104a-104n and analyze the responses. The GUI-based platform is further used to provide responses or information associated with the responses to the users of the user devices 108a-108d. The information associated with the responses can include various dashboards or other visualizations related to different aspects of the responses, at least some of which may include results of analyses performed by the GUI-based platform. Some, most, or all of these functions can be supported using GUI-based interactions with the users of the user devices 108a-108d.

In some instances, the originating organization associated with the originating system 102 assembles or otherwise manufactures (or would like to manufacture) products that are defined based on information received from one or more customers of the originating organization. For example, an originating organization may operate an electronics assembly facility and may receive information related to assembling parts into finished electronic products from different electronics companies. As another example, a government contractor may assemble parts to produce defense-related products and may receive information related to specific defense-related products that one or more government agencies wish to procure. Thus, in FIG. 1, the originating system 102 may optionally interact with at least one customer system 122, which generally represents at least one computing system that is owned by, operated by, or otherwise associated with at least one individual or organization that provides one or more initial customer or other information to the originating system 102. In these embodiments, the information that is generated by the originating system 102 and sent to the supplier systems 104a-104n may be based on the initial customer requests or other information received by the originating system 102 from one or more customer systems 122. For instance, it is common for many terms of a customer request to be included in the information generated by the originating system 102.

An optional third-party platform 124 is also shown in FIG. 1. In some embodiments, the data by the database server 114 and database 116 may be implemented partially or completely outside the originating system 102. Thus, the third-party platform 124 may include one or more servers, databases, and other components implementing a GUI-based platform that is accessible by both users of the originating system 102 and users of the supplier systems 104a-104n. The party that owns or operates the third-party platform 124 may therefore be a separate party and not represent either an originating organization that issues requests or a supplier organization that responds to requests. In other embodiments, the GUI-based platform can be implemented in the originating system 102, and the third-party platform 124 may be used to route requests and/or other information to the supplier systems 104a-104n, route responses to the originating system 102, or otherwise support indirect electronic communications between the systems 102, 104a-104n. For instance, responses may be exchanged between the originating system 102 and the supplier systems 104a-104n through email or through data uploads/downloads via the third-party platform 124. Note, however, that any suitable form of direct or indirect communication between the originating system 102 and the supplier systems 104a-104n may be used here.

The GUI-based platform provided by the application server 112, database server 114, database 116, third-party platform 124, or other suitable component(s) can support a number of tools and other functions described below. The following description represents a brief introduction to various examples of the types of functions that can be performed by the GUI-based platform. Additional details for various ones of these functions are provided below. However, the GUI-based platform can also perform a number of additional functions, some of which are also described further below but which are omitted here for brevity. In the following discussion, it is assumed that the GUI-based platform is implemented within the originating system 102, but the GUI-based platform may be implemented in any other suitable manner.

Assume an initial customer request is received by the application server 112 from a customer system 122, where the initial customer requests may have any suitable format. The initial customer may request that the originating organization submit a bid for providing a specific product to a particular customer. The GUI-based platform can apply a trained machine learning model or other logic to the initial customer requests (regardless of its format) in order to (i) identify elements to be acted upon in the initial customer requests and (ii) map specified elements in the initial customer requests to a predefined data dictionary. The predefined data dictionary can represent known or expected fields or contents related to requests or responses, and mapping the specified elements in the initial customer requests to the predefined data dictionary enables further processing downstream.

Now assume that the initial customer request requires the originating organization to issue its own requests to its suppliers so that the originating organization can collect the necessary information and generate an appropriate bid. The application server 112 can apply a trained machine learning model or other logic to identify requirements from the initial customer requests that need to flow down or be applied to any suppliers used by the originating organization, and those requirements can be included in one or more requests to be generated for those suppliers. The application server 112 can also use a GUI-based tool, such as one that supports an interactive user question and answer session, to interpret user inputs and identify the specific requirements that need to be applied to the one or more requests to be generated. The specific requirements here may be based on lengthy and complex regulatory requirements (such as FAR and DFARS requirements), but the GUI-based tool is designed based on a conversion of these complex regulatory requirements into a simplified format (such as plain English instructions) applicable to the specific requests being generated. Thus, the GUI-based tool can allow the user to specify and control the contents of the requests being generated based on user inputs and ensure that required contents are included in the requests being generated.

As part of the request generation process, the application server 112 supports bill of materials (BOM) characterization. A bill of materials typically identifies all materials for a specific product and the quantity of each material. The application server 112 can apply a trained machine learning model or other logic to gather data related to the bill of materials for a product associated with at least one request being generated (possibly from multiple sources) and organize the data into a standardized or predefined format. Often times, this involves grouping related materials from the BOM into different groups of materials. The application server 112 can also generate (or interact with users to obtain) bid groups, which identify potential suppliers for different groups of materials. The application server 112 can further generate unique visualizations that allow users to view different characterizations of the bill of materials and the bid groups, such as to verify whether applicable small business, women-owned business, minority-owned business, veteran-owned business, or other diversity-related classification requirements are satisfied based on those bid groups. A specific combination of different groups of materials and the potential suppliers for those groups is referred to as a material sourcing plan. Once a desired material sourcing plan is identified and selected, requests can be generated and sent to the supplier systems 104a-104n of the suppliers identified in that material sourcing plan by the application server 112.

After one or more requests are generated and sent to the supplier systems 104a-104n, various requests responses are typically received from the suppliers. The application server 112 can apply a trained machine learning model or other logic to the requests responses (regardless of their format) in order to (i) identify elements to be acted upon in the requests responses and (ii) map specified elements in the request responses to the predefined data dictionary. Again, this mapping enables further processing downstream. The application server 112 can also apply extracted information from each response to an auto-compliance matrix, which identifies the necessary contents or other information in order for the response to be considered compliant. In some instances, for example, the auto-compliance matrix may represent an encoded version of information from the FAR and DFARS regulations or from Defense Contract Management Agency (DCMA)/Defense Contract Audit Agency (DCAA) audit guidance. This is essentially a compliance check to determine whether each response satisfies all applicable conditions (such as applicable government requirements), and the results of the compliance check can be presented to each associated supplier (particularly if a non-compliance issue is detected). This allows the supplier to immediately identify any issues resulting in a lack of compliance, and the supplier can take steps to resolve the non-compliance issues, such as updating the supplier's response. The application server 112 can track corrections submitted by each supplier over time until compliance is achieved.

The responses or data associated with the responses can also be analyzed in various ways in order to generate additional information and visualizations for users of the originating organization. Under applicable regulations (such as FAR), different types of price analyses are permitted, but those price analyses routinely do not provide the exact same results. The application server 112 can apply a trained machine learning model or other logic to gather data from multiple sources, perform all or user-selected price analyses related to responses, and graphically display the results of the price analyses simultaneously to the user. The results can be presented in a format that allows the user to easily identify bad or dubious data points and annotate or exclude data points used by the application server 112, and automated generation of FAR-compliant price analysis reports or other reports can be supported.

In addition, U.S. government requirements often include complex requirements for cost proposals, and failure to satisfy all of these requirements when submitting a bid may result in delays or rejection of the bid. The application server 112 can support the automatic generation of a supplier proposal adequacy checklist (SPAC) or other contents to be included in or to be used to generate a bid that is submitted in response to a U.S. government request. The checklist can include regulatory references and examples of adequate/inadequate proposals, or other suitable contents can be generated that support compliance with the complex requirements for cost proposals.

Using these and other functions, the GUI-based platform can greatly simplify the process of generating requests, receiving responses, analyzing the requests responses (such as to ensure compliance), generating visualizations, and (if necessary) producing information in documentary or other forms for submission to the U.S. government or other customer. In some embodiments, the GUI-based platform can provide a single user interface through which all interactions between users of the originating system 102 and the GUI-based platform can occur. The entire process (from receipt of a customer request, through submissions of requests to suppliers and analyses of supplier responses, to generation of a final bid to the customer requests) can be completed in significantly shorter time and with significantly fewer resources. As a particular example, the amount of time for the entire process may be reduced by 67% or even more. Also, the GUI-based platform can provide for centralized storage of digitized and normalized related data and can perform standardized functions across all processes for an organization (including standardized automated analyses, dashboard generation, and reporting). Further, the GUI-based platform supports auto-population of graphical user interfaces and forms, compliance verification, and other operations that help to facilitate the receipt of compliant responses and the generation of compliant government or other bids in response to customer requests. In addition, the GUI-based platform supports an enterprise-to-enterprise (E2E) solution that overall helps in the identification of risks and opportunities within request processes, provides many opportunities for improvement, and enables more data-driven decisions to be made. Of course, the actual benefits obtained in any specific implementation of the system 100 can vary based on a number of factors, so the benefits described above can vary based on the implementation.

Although FIG. 1 illustrates one example of a system 100 supporting a GUI-based platform, various changes may be made to FIG. 1. For example, the system 100 may include any suitable number of originating systems 102, supplier systems 104*a*-104*n*, and networks 106, and each originating system 102 may include any suitable number of user devices 108*a*-108*d*, networks 110, servers 112, 114, and databases 116. Also, these components may be located in any suitable locations and might be distributed over a large area. Moreover, while not shown here, each of the supplier systems 104*a*-104*n* may include one, some, or all of the same components shown in the originating system 102, although the supplier systems 104*a*-104*n* need not include a GUI-based platform (although they may). Further, various components shown in FIG. 1 may be combined, further subdivided, replicated, omitted, or placed in any other suitable arrangement and additional components may be added according to particular needs. In addition, while FIG. 1 illustrates one example operational environment in which a GUI-based platform may be used, this functionality may be used in any other suitable system.

Figure 2:
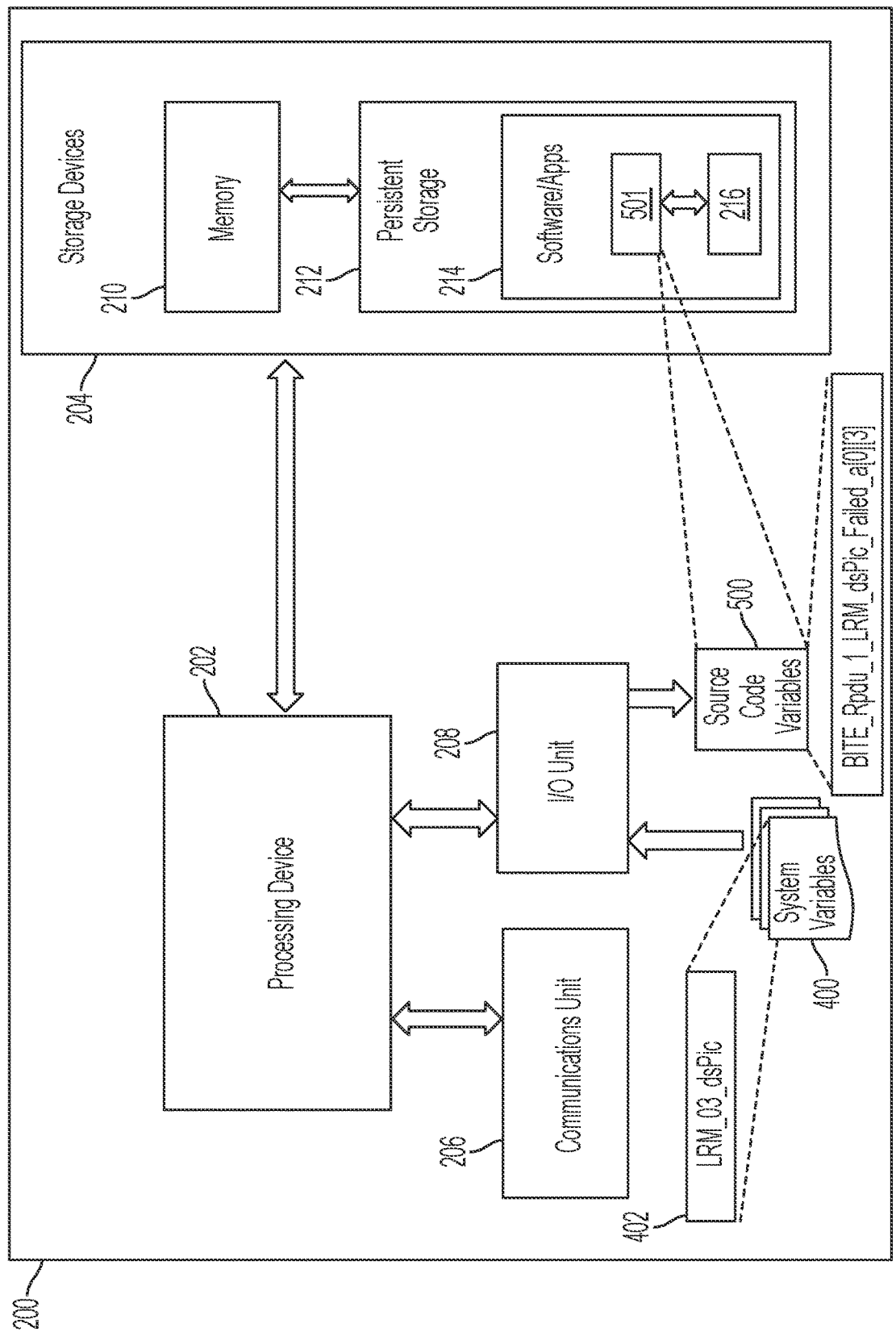
FIG. 2 is an OBD code variable generation system capable of generating configuration based optimized diagnostic source code variables according to a non-limiting embodiment of the present disclosure.

FIG. 2 illustrates an OBD code variable generation system 200 supporting at least part of a GUI-based platform according to this disclosure. One or more instances of the OBD code variable generation system 200 may for example, be used to at least partially implement the functionality of the application server 112 or the database server 114 of FIG. 1. However, the functionality of the application server 112 or the database server 114 may be implemented in any other suitable manner. Also, each of these components may be implemented in any other suitable manner.

As shown in FIG. 2, the OBD code variable generation system 200 denotes a computing device or system that includes at least one processing device 202 (e.g., a hardware processor), at least one data storage device 204, at least one communications unit 206, and at least one input/output (I/O) unit 208. The processing device 202 may execute instructions that can be loaded into a memory 210. The instructions executed by the processing device 202 may include instructions that implement at least part of a GUI-based platform (or some of the functions described below outside a GUI-based platform). The processing device 202 includes any suitable number(s) and type(s) of processors or other processing devices in any suitable arrangement. Example types of processing devices 202 include one or more microprocessors, microcontrollers, digital signal processors (DSPs), application specific integrated circuits (ASICs), field programmable gate arrays (FPGAs), or discrete circuitry.

The memory 210 and a persistent storage 212 are examples of data storage devices 204, which represent any structure(s) capable of storing and facilitating retrieval of information (such as data, program code, and/or other suitable information on a temporary or permanent basis). The memory 210 may represent a random access memory or any other suitable volatile or non-volatile storage device(s). The persistent storage 212 may contain one or more components or devices supporting longer-term storage of data, such as a read only memory, hard drive, Flash memory, or optical disc.

The persistent storage 212 may also include one or more software programs and/or software applications 214 (typically referred to as "apps"). According to one or more non-limiting embodiments, the software programs include a built-in-test (BIT) program, which processes diagnostic software code output from a OBD system of a vehicle (e.g., an aircraft) and determines a system variable 402 based on the diagnostic software code. Based on the system variable 402, the BIT program 216 automatically generates a source code variable 310 which is indicative of a system fault occurring in the vehicle (e.g., the aircraft). In one or more non limiting embodiments, the BIT program 216 can generate and store in the persistent storage 212 a source code variable database/electronic workbook 500, which includes all the source code variables 310 generated by BIT program 216.

The communications unit 206 supports communications with other systems or devices. For example, the communications unit 206 can include a network interface card or a wireless transceiver facilitating communications over a wired or wireless network. The communications unit 206 may support communications through any suitable physical or wireless communication link(s). As a particular example, the communications unit 206 may support communication over the network(s) 106, 110 of FIG. 1.

The I/O unit 208 allows for input and output of data. For example, the I/O unit 208 may provide a connection for user input through a keyboard, mouse, keypad, touchscreen, or other suitable input device. The I/O unit 208 may also send output to a display, printer, or other suitable output device. Note, however, that the I/O unit 208 may be omitted if the OBD code variable generation system 200 does not require local I/O, such as when the OBD code variable generation system 200 represents a server or other device that can be accessed remotely.

In one or more non-limiting embodiments, the I/O unit 208 is configured to receive as an input one or more data workbooks 400 that includes one or more system variables 402. As described herein, the system variables 402 are indicative of system faults corresponding to vehicle system, e.g., a respective line-replaceable modules (LRMs) 308a-308n of a remote power distribution unit (RPDU) 304 included in a power distribution system of an aircraft 300. Accordingly, the processor 202 can execute the BIT program 216, which extracts the system variables 402 and automatically generates source code that defines source code variables 310 representing the system variables 402.

Although FIG. 2 illustrates one example of a OBD code variable generation system 200 supporting at least part of a GUI-based platform, various changes may be made to FIG. 2. For example, computing and communication devices and systems come in a wide variety of configurations, and FIG. 2 does not limit this disclosure to any particular computing or communication device or system.

Figure 3B:
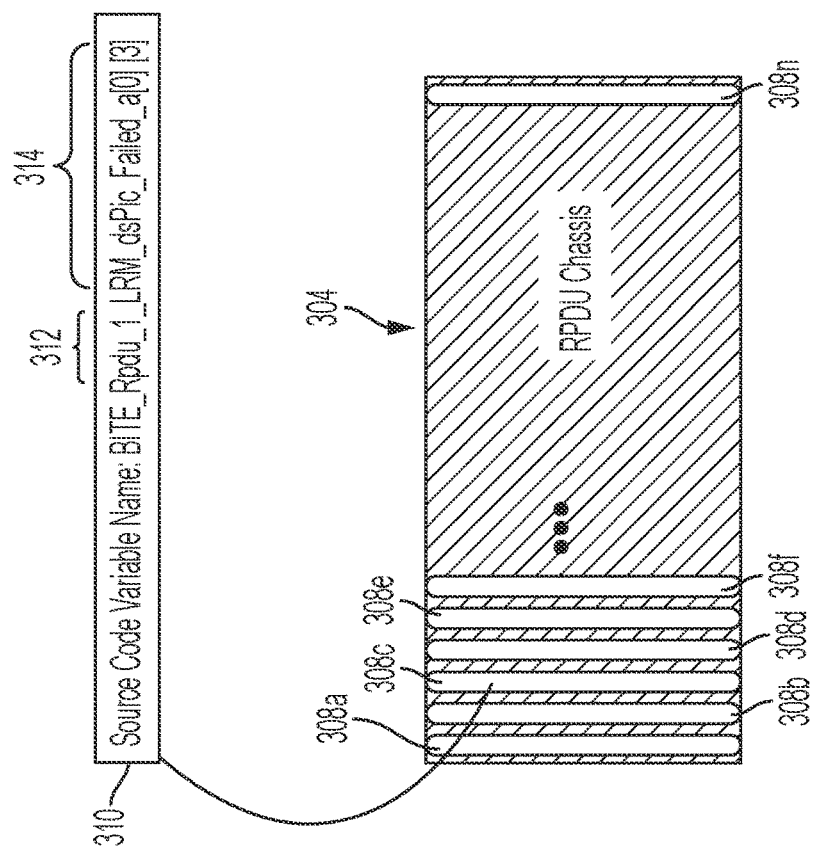
FIG. 3B depicts a RPDU including a plurality of line-replaceable modules (LRMs) capable of experiencing a system fault according to a non-limiting embodiment.
Figure 3A:
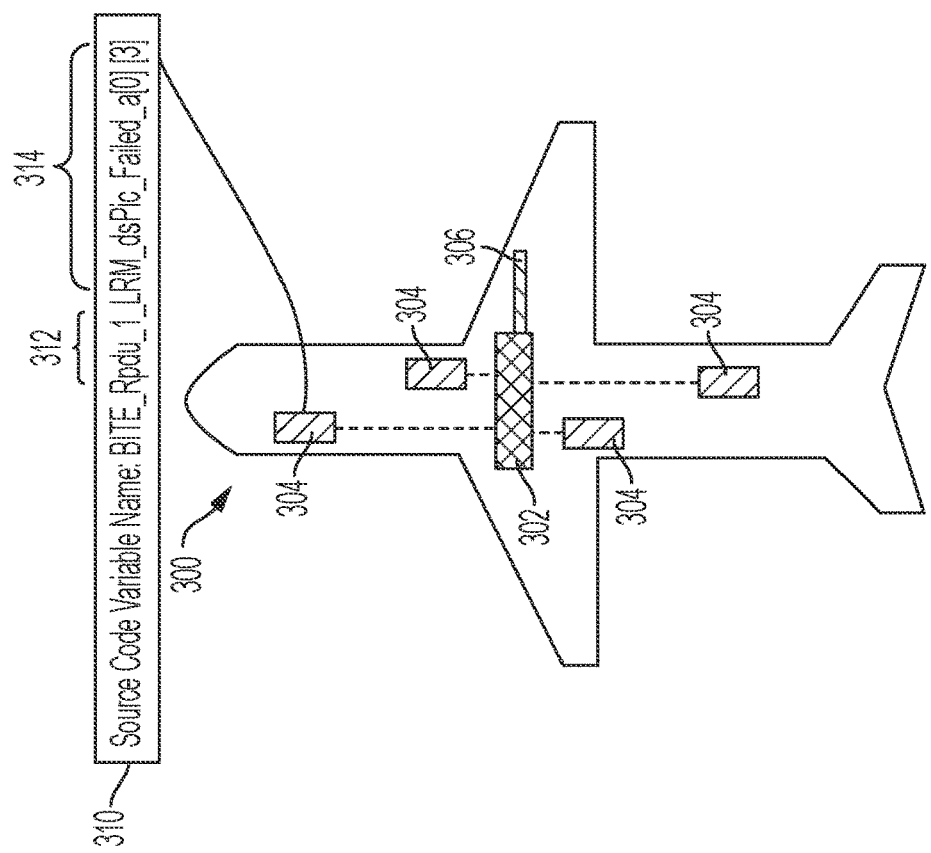
FIG. 3A depicts an aircraft including an OBD system configured to monitor and detect system faults of one or more remote power distribution units (RPDUs) according to a non-limiting embodiment.

Turning now to FIG. 3A, an aircraft 300 is illustrated according to a non-limiting embodiment. The aircraft 300 includes a controller 302, one or more remote power distribution units 304, and a communication bus 306. The remote power distribution units (RPDUs) 304 can be located throughout the aircraft 300 to form a solid state power distribution system, which provides power distribution functionality for the aircraft 300. Each of the RPDUs 304 distribute power to a respective aircraft system to power electrically powered devices, such as window wipers, fans, pumps, galley and interior lights, to be controlled and protected.

As shown in FIG. 3B, each of the RPDUs 304 include one or more line-replaceable modules (LRM_1-LRM_N) 308a-308n. The LRMs 308a-308n are configured to be replaced quickly or swapped out with a different or new LRM. Each LRM 308a-308n includes device-specific electrical components such as, for example, microprocessors, amplifiers, voltage converters, power distribution busses, etc., which are configured to power and operate the electrically power devices powered by the respective RPDU 304.

The controller 302 is in signal communication with the communication bus 306, along with each of the RPDUs 304 to establish an OBD system. The controller 302 is configured to monitor operation of the RPDUs 304 and detect one or more system faults occurring in one more of the RPDUs 304. According to one or more non-limiting embodiments, the controller 304 can monitor a given RPDU 304 and detect a fault occurring in one or more of the LRMs 308a-308n. In response to detecting a system fault, the controller 302 can generate an ODM source code variable that identifies the detected fault occurring in the LRM 308a-308n of a given RPDU 304 and outputs the ODM source code variable to the communication bus 306. The source code variable 310 includes first index data 312 that identifies the particular RPDU 304 experiencing a fault and second index data 314 indicating the particular LRM 308a-308n causing the fault. Accordingly, an ODM scanning tool can be connected to the communication bus 306 to read out the ODM source code variable and determine the specific system fault and fault location occurring in the aircraft 300.

As described herein, conventional methods of generating the ODM source code variable involves a technician to manually record the source code variables into a database or workbook and then generate source code variables using software source code capable of being processed by an ODM scanning tool, and which are intended to mirror the system code variables that represents the occurrence of a system faults e.g., faults associated with one or more LRMs 308a-308n included in a given RPDUs 304. As a result, the source code variables are susceptible to human error and may include various discrepancies and inaccuracies.

Non-limiting embodiments of the disclosure described herein avoid human error when generating the source code variables by providing an OBD code variable generation system 200 that processes a data workbook including system variables 400 indicative of system faults (e.g., system faults corresponding to LRMs 308a-308n of a given RPDU 304) to automatically generate configuration based optimized diagnostic source code variables 310.

Referring collectively to FIGS. 4A, 4B and 4C, a system variable workbook 400 used by the OBD code variable generation system 200 is depicted according to a non-limiting embodiment. The system variable workbook 400 includes one or more system variables 402 and one or more fault conditions 404 corresponding a respective system variable 402. The system variables 402 are indicative of system faults corresponding to respective line-replaceable modules 308a-308n of a remote power distribution unit 304. The fault conditions 404 represent system operating conditions, which when present or occur, will cause the corresponding system fault indicated by the system variable 402 to occur.

The data (e.g., the system variables 402) of the system variable workbook 400 is then input into the OBD code variable generation system 200. The OBD code variable generation system 200 then processes the data of the system variable workbook 400 and automatically extracts the system variables 402. The OBD code variable generation system 200 then automatically adds one or more source code variable parameters to the extracted system variables 402. The source code variable parameters can include, but are not limited to, a OBD system prefix (e.g., "BITE") indicative of the system and/or software used to process the OBD source code, and a system suffix indicating the system or device (e.g. the particular LRM_N) associated with the system variable. The format of the resulting source code (i.e., the extracted system variable combined with the source code variable parameters) defines the diagnostic source code variable 310. Accordingly, the resulting source code variable can be automatically generated having a source code variable format that is compatible with the BIT, i.e., can be generated having a software source code format that can be properly processed by the BIT program.

In one or more non-limiting embodiments, the OBD code variable generation system 200 can utilize a program (e.g., BIT program 216) to generate an source variable database or electronic workbook 500 (e.g., stored in memory), which includes one or more of the automatically generated diagnostic source variables 310. The source variable workbook 500 can be displayed using a display unit included in the I/O unit 208 and manipulated using an input device (e.g., mouse, keyboard, touchscreen, etc.) included in the I/O unit 208.

Referring to FIG. 5, for example, a source code variable workbook 500 is depicted according to a non-limiting embodiment. The source code variable workbook 500 includes multiple diagnostic source variables 310 automatically generated by the OBD code variable generation system 200 using the system variables 402 extracted from the system variable workbook 400. As shown in FIG. 5, the OBD code variable generation system 200 automatically generates multiple diagnostic source code variables 310 to include a combination of the extracted system variable and the source code variable parameters (e.g., the OBD system prefix and the system suffix) in a consistent format that avoids the introduction of inaccuracies and/or discrepancies caused by human-error.

According to a non-limiting embodiment, the OBD code variable generation system 200 can detect when a source code variable is generated with a source code format that conflicts with the source code format that is compatible with the BIT program. The format conflict can include, for example, one or more errors or discrepancies between an automatically generated source code variables 310 and its corresponding system variable 402. For instance, the aircraft 300 includes a set number of RPDUs 304, which are assigned a corresponding RPDU identification number. In an example where the aircraft 300 includes 15 RPDUs 304, the RPDU identification numbers would range from 1 to 15. Accordingly, the system variables 402 can include an RPDU identification number (e.g., 1 to 15), which identifies a particular RPDU 304.

In FIG. 5, two of the system variables 402 are recorded with an RPDU identification number (e.g., RPDU_20_LRM_03_FIRST_RCVD_DATA and RPDU_0_LRM_05_PS_BUS_A_FAILED), which falls out-of-range (e.g., "RPDU_20" and "RPDU_0") of the total number of RPDUs 304 (e.g., RPDU_1 to RPDU_15) included in the aircraft 300. Accordingly, the OBD code variable generation system 200 detects two erroneous system variables 402, and display an alert 502 identifying that erroneous system variables 402.

Figure 6:
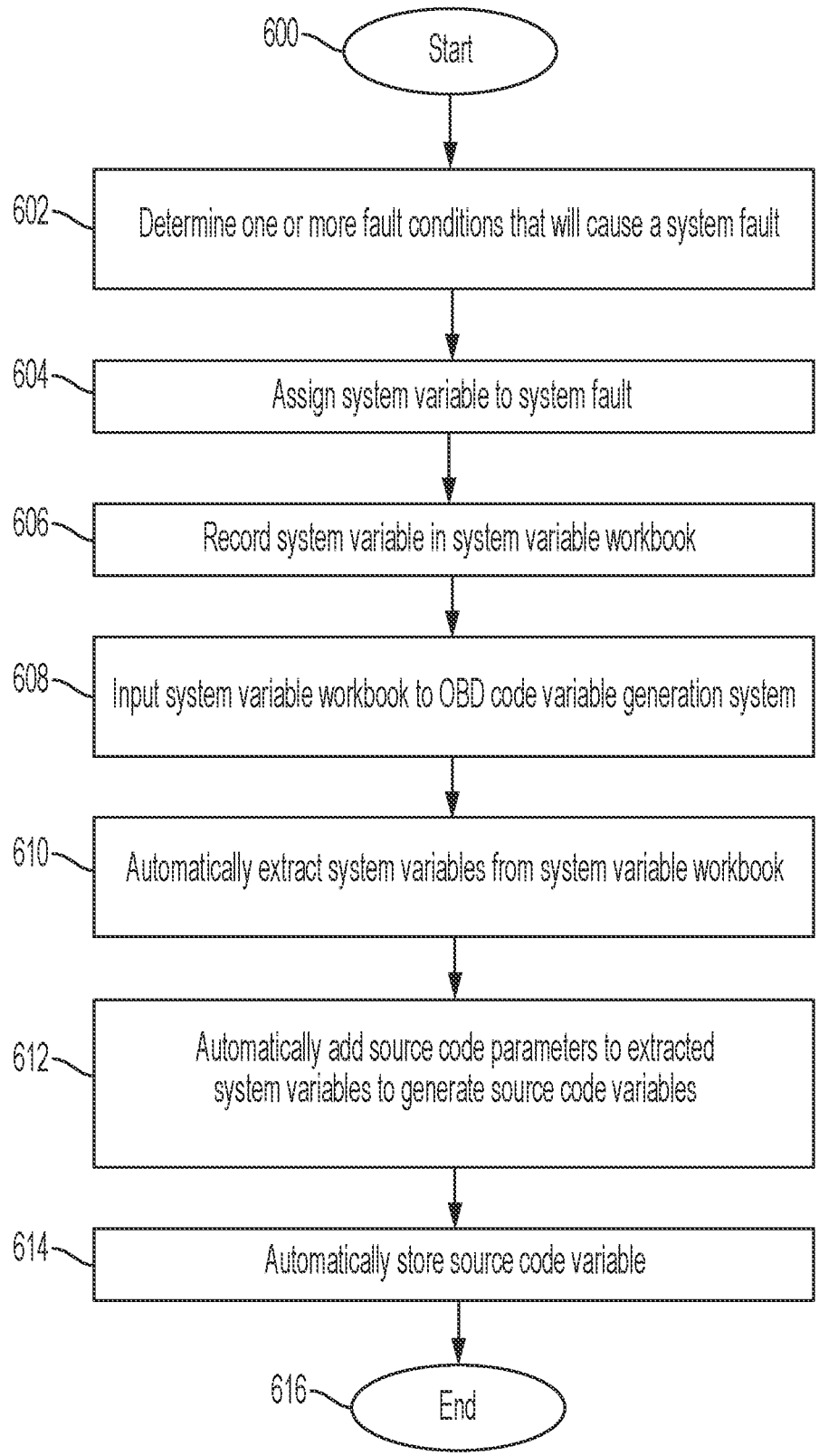
FIG. 6 is a flow diagram illustrating a method of generating optimized diagnostic source code variables according to a non-limiting embodiment.

Turning now to FIG. 6, a method of generating optimized diagnostic source code variables is illustrated according to a non-limiting embodiment. The method begins at operation 600 and at operation 602 one or more fault conditions that will cause a system fault are determined. At operation 604, system variables are assigned to each system fault, and the system variables are recorded in a system variable workbook at operation 606. At operation 608, the system variable workbook is input to an OBD code variable generation system. At operation 610, the OBD code variable generation system automatically extracts the system variables from the system variable workbook, and at operation 612 the OBD code variable generation system automatically adds source code variable parameters to the extracted system variables. Accordingly, source code variables are generated, which can be read and processed by an OBD tool and/or BIT software program. At operation, 614, the source code variables are stored (e.g., in a database stored in a memory and/or an electronic workbook stored in memory), and the method ends at operation 616.

The terms "about" and "substantially" are intended to include the degree of error associated with measurement of the particular quantity based upon the equipment available at the time of filing the application. For example, "about" or "substantially" can include a range of ±8% or 5%, or 2% of a given value. The terminology used herein is for the purpose of describing particular embodiments only and is not intended to be limiting of the present disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made, and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure is not limited to the particular embodiment disclosed as the best mode contemplated for carrying out this present disclosure, but that the present disclosure will include all embodiments falling within the scope of the claims.

What is claimed is:

1. An on-board diagnostic (OBD) code variable generation system comprising:
    a data storage device configured to a-store a built-in test (BIT) program and one or more source code variable parameters defined by a source code variable format compatible with the BIT;
    a processor in signal communication with the data storage device, the processor configured to receive at least one system variable utilized by an OBD system to indicate a system fault of a vehicle, the at least one system variable indexed to the system fault of the vehicle,
    wherein the processor automatically adds the one or more source code variable parameters to the at least one system variable to generate a source code variable having the source code variable format, the source code variable processed by the OBD code variable generation system and utilized by the BIT program to indicate the system fault is actually present in the vehicle, and
    wherein the OBD code variable generation system detects an actual system fault in an inspected vehicle and displays the source code variable indicating the system fault is actually present in the vehicle.

2. The OBD code variable generation system of claim 1, wherein the one or more source code variable parameters includes an OBD system prefix indicative of a system and/or software used to process the OBD software code, and a system suffix identifying one or more devices included in the vehicle and associated with the system fault indicated by the at least one system variable.

3. The OBD code variable generation system of claim 1, wherein in response to generating the source code variable, the processor automatically stores the source code variable in the data storage device.

4. The OBD code variable generation system of claim 3, wherein the BIT program generates an electronic source variable workbook which is stored in the data storage device and the processor automatically stores the source code variable in the electronic source variable workbook.

5. The OBD code variable generation system of claim 4, wherein the processor receives an electronic system variable workbook, automatically extracts a plurality of system variables from the system variable workbook, and automatically generates the source code variable corresponding to each of the system variables.

6. The OBD code variable generation system of claim 2, wherein the system is a power distribution system device included in the vehicle and the one or more devices includes a line-replaceable modules (LRM) included in the power distribution system.

7. The OBD code variable generation system of claim 1, wherein the BIT program generates an alert in response to the source code variable conflicting with the source code variable format.

8. A method of generating an on-board diagnostic (OBD) code variable, the method comprising:
storing, in a data storage device, a built-in test (BIT) program and one or more source code variable parameters defined by a source code variable format compatible with the BIT;
inputting, to a processor, at least one system variable utilized by an OBD code variable generation system to indicate a system fault of a vehicle, the at least one system variable indexed to the system fault of the vehicle;
automatically adding, by the processor, one or more source code variable parameters to the at least one system variable to generate a source code variable having the source code variable format, the source code variable processed by the OBD code variable generation system and utilized by the BIT program to indicate the system fault is actually present in the vehicle; and
detecting, by the OBD code variable generation system, an actual system fault in an inspected vehicle; and
displaying, by the OBD code variable generation system, the source code variable indicating the system fault is actually present in the vehicle.

9. The method of claim 8, wherein adding the source code variable parameters includes adding, to the at least one system variable, an OBD system prefix indicative of a system and/or software used to process the OBD software code.

10. The method of claim 8, wherein adding the source code variable parameters includes adding a system suffix identifying one or more devices included in the vehicle and associated with the system fault indicated by the at least one system variable.

11. The method of claim 8, wherein in response to generating the source code variable, the processor automatically stores the source code variable in the data storage device.

12. The method of claim 11, further comprising:
generating, by the BIT program, an electronic source variable workbook which is stored in the data storage device; and
automatically storing, by the processor, the source code variable in the electronic source variable workbook.

13. The method of claim 12, further comprising:
inputting an electronic system variable workbook to the processor;
automatically extracting, by the processor, a plurality of system variables from the system variable workbook; and
automatically generating, by the processor, the source code variable corresponding to each of the system variables.

14. The method of claim 8, wherein the system is a power distribution system device included in the vehicle and the one or more devices includes a line-replaceable modules (LRM) included in the power distribution system.

15. The method of claim 8, further comprising generating an alert in response to the source code variable conflicting with the source code variable format.

* * * * *